Patented Sept. 1, 1942

2,294,428

UNITED STATES PATENT OFFICE 2,294,428

TREATMENT OF FISH

Paul Stockhamer, London, England

No Drawing. Application March 24, 1941, Serial No. 385,005. In Great Britain December 31, 1940

16 Claims. (Cl. 99—160)

This invention relates to a process for treating fish which have been preserved by salting for the purpose of rendering them palatable and suitable for consumption. The invention relates also to an improved mode of salting fish for the preservation thereof.

The reliable preservation of fish by means of salt requires the use of about 30–40% by weight of salt on the weight of the fish; this is a high percentage of salt and inasmuch represents a drawback since the sufficient removal thereof when the fish are to be marketed or consumed is a matter of some difficulty. Watering for say twenty-four, or even thirty-six, hours still leaves the fish with an unpleasant salty taste which is unacceptable to buyers, and experience shows that some forty-eight hours' water treatment is necessary in order to remove the preserving salt to a sufficient degree to ensure palatability. The fish, however, must then be consumed within a fairly short period, as with such thorough desalting it is very liable to deteriorate owing to putrefaction or mould formation.

The object of this invention is to provide a desalting process in which danger of putrefaction or mould formation consequent upon the lengthy watering treatment is obviated.

With this object in view, the desalting process provided by the invention consists in watering the fish with an aqueous solution containing at least one food preservative salt to prevent putrefaction together with carbonate and/or bicarbonate, and a very small amount of pepsin and/or papain. Use is also made of a small amount of an additional food preservative which is capable of preventing the formation of mould on the desalted fish.

It is customary practice in the watering of salted fish to employ a soft water for the purpose, and the carbonate ingredient in the solution used in the process according to the invention has a water-softening effect. The proteolytic enzyme viz., the pepsin or papain, although present in very small amount, loosens the connective tissue of the fish flesh and so permits the solution to enter the flesh tissue more efficiently, whilst the food-preservative salt and the additional food preservative prevent putrefaction and mould formation on the desalted fish.

The food preservative salt used is preferably one selected from the following: sulphites, bisulphites, hydrosulphites, and metabisulphites. These salts, containing a sulphite radical, have been found to have the desirable effect of maintaining the whiteness of the fish flesh. The additional food preservative capable of preventing mould formation may conveniently be p-hydroxybenzoic acid or a salt thereof; whilst the main food preservative salt and carbonate may each constitute round about 50% by weight of the total ingredients used for compounding the desalting liquor, and the additional food preservative up to about 5% by weight, the enzyme must be present only in a very small proportion (e. g. up to 0.01%) and in any case at a concentration insufficiently high for the connective tissue to be weakened so much that the flesh of the fish falls apart.

In carrying out the process according to the invention the ingredients of the desalting liquor are dissolved in water to form a very dilute solution for example, so that the sulphite and carbonate are each present in the resulting solution in a concentration of say 0.02–0.05% by weight. The lower concentration will be chosen for treating small fish and the higher for treating large fish. At the concentration mentioned, the weight of desalting liquor required will be somewhere about twice the weight of the fish being treated.

The treatment may be carried out by immersing the fish in the liquor or by allowing the liquor to flow over the fish. In the former case it is advisable to steep the fish in several lots of liquor, each steeping lasting say eight hours; it is preferable to keep the fish moving in the liquor during the steeping.

For use in carrying out the process the ingredients of the watering solution are very conveniently compounded in the form of tablets, which just require dissolution in water to prepare the desalting liquor. The tablets may contain, for example: 50% metabisulphite of sodium or of other alkali metal, 45% sodium bicarbonate, 5% p-hydroxybenzoic acid sodium salt and 0.001–0.002% of pepsin or papain. The tablets are conveniently each of 2 gms. weight. For use such tablets will be dissolved in water in the proportion of 60–100 tablets (according as the fish are small or large) to 500 lbs. of water. One hundred gallons of such solution will suffice for the treatment of some 500 lbs. of fish.

Fish desalted by the process of the invention resemble fresh fish in appearance, taste and quality. The flesh is firm and white with the nutritive value of the flesh of fresh fish; the preserved fish also cook like fresh fish.

Experiments have also shown that the chemicals employed in the desalting process, with the exception of the carbonate constituent may very advantageously be employed also in the salting operation. Less salt is then required and correspondingly less time is necessary for effecting the desalting. Accordingly, the invention includes also a process for salting fish which consists in effecting the salting treatment in the presence of at least one food preservative salt and a very small amount of pepsin and/or papain. Use is also made of a small amount of an additional food preservative which is capable of preventing the formation of mould.

As before the action of the trace of enzyme on the connective tissue enables the salt and other preserving ingredients to gain more ready access to the interior of the flesh, so that a more rapid and more thorough preservation treatment results.

As in the desalting treatment the food preservative salt for the salting stage is preferably chosen from the sulphite group mentioned above, and the additional food preservative capable of preventing the formation of mould may be as before, p-hydroxybenzoic acid or a salt thereof. The ingredients may conveniently be compounded in tablet form. Thus the tablets may weigh 1 gram each and may contain: 95% metabisulphite of sodium (or other metal), 5% p-hydroxybenzoic acid sodium salt, and 0.0005–0.001% of papain and/or pepsin. Forty to sixty such tablets may be used to 100 kg. of fish, when the salt used may be reduced from 30–40 kg. down to 15–20 kg. Fish salted in this way may be desalted by the above method in as short a time as 16–24 hours, and yield a product indistinguishable from fresh fish as regards taste, odour, quality and appearance as well as cooking qualities.

What I claim is:

1. A process for desalting fish which consists in watering the fish with an aqueous solution containing at least one food preservative salt together with a carbonate and a very small amount of a proteolytic enzyme selected from the group consisting of pepsin and papain.

2. A process for desalting fish which consists in watering the fish with an aqueous solution containing at least one food preservative salt together with carbonate, a small amount of additional food preservative capable of preventing the formation of mould on the desalted fish and a very small amount of a proteolytic enzyme selected from the group consisting of pepsin and papain.

3. A process as claimed in claim 1, in which the food preservative salt consists of at least one salt of the sulphite group.

4. A process as claimed in claim 2, in which the additional food preservative capable of preventing mould formation is p-hydroxybenzoic acid or a salt thereof.

5. A process as claimed in claim 1, in which the concentration of the proteolytic enzyme does not exceed 0.01% by weight of the total ingredients of the solution, so as to be below the concentration which causes the fish flesh to fall apart.

6. A process as claimed in claim 1, in which the food preservative salt and carbonate constituents each amount to roughly 50% by weight of the ingredients of the solution.

7. A process as claimed in claim 2, in which the watering solution ingredients are made up of about 50% by weight of alkali metal metabisulphite, about 45% by weight of sodium bicarbonate, about 5% by weight of p-hydroxybenzoic acid sodium salt, and 0.001–0.002% by weight of proteolytic enzyme.

8. Tablets for desalting fish consisting of about 50% by weight of alkali metal metabisulphite, about 45% by weight of sodium bicarbonate, about 5% by weight of p-hydroxybenzoic acid sodium salt, and 0.001–0.002% by weight of a proteolytic enzyme selected from the group consisting of pepsin and papain.

9. A process for treating fish for preserving the same, consisting in treating the fish with salt in the presence of at least one food preservative salt together with a very small amount of a proteolytic enzyme selected from the group consisting of pepin and papain, and a small amount of additional food preservative capable of preventing the formation of mould, the treated fish being desalted before marketing or consumption by watering with a solution containing at least one food preservative salt together with carbonate and bicarbonate, a very small amount of a proteolytic enzyme selected from the group consisting of pepsin and papain and a small amount of an additional food preservative capable of preventing the formation of mould on the desalted fish.

10. A process for salting fish, consisting in carrying out the salting treatment in the presence of at least one food preservative salt and a very small amount of a proteolytic enzyme selected from the group consisting of pepsin and papain for the purpose of substantially reducing the amount of salt required for the actual salting and correspondingly also the time subsequently required for effecting the desalting.

11. A process for salting fish, consisting in carrying out the salting treatment in the presence of at least one food preservative salt together with a small amount of an additional food preservative capable of preventing the formation of mould, and a very small amount of a proteolytic enzyme selected from the group consisting of pepsin and papain for the purpose of substantially reducing the amount of salt required for the actual salting and correspondingly also the time subsequently required for effecting the desalting.

12. A process as claimed in claim 10, in which the food preservative salt consists of at least one salt of the sulphite group.

13. A process as claimed in claim 11, in which the additional food preservative capable of preventing mould formation is p-hydroxybenzoic acid or a salt thereof.

14. A process as claimed in claim 10, in which the concentration of the proteolytic enzyme does not exceed 0.01% by weight of the total ingredients of the solution so as to be below the concentration which causes the fish flesh to fall apart.

15. A process as claimed in claim 11, in which the food preservative salt and the additional food preservative which will prevent mould formation are used in the proportion of about 95% by weight of the former to 5% by weight of the latter.

16. Tablets for use in a process for salting fish, consisting of about 95% by weight of metabisulphite of an alkali metal, about 5% by weight of p-hydroxybenzoic acid sodium salt, and 0.0005–0.001% by weight of a proteolytic enzyme selected from the group consisting of pepsin and papain.

PAUL STOCKHAMER.